United States Patent [19]

Benczur-ürmössy

[11] 4,301,218

[45] Nov. 17, 1981

[54] BI-POROUS RANEY-NICKEL ELECTRODE

[75] Inventor: Gabor Benczur-ürmössy, Stuttgart, Fed. Rep. of Germany

[73] Assignee: Deutsche Automobilgesellschaft mbH, Hannover, Fed. Rep. of Germany

[21] Appl. No.: 62,119

[22] Filed: Jul. 30, 1979

[30] Foreign Application Priority Data

Aug. 12, 1978 [DE] Fed. Rep. of Germany ....... 2835506

[51] Int. Cl.³ .................. H01M 4/98; H01M 4/96; H01M 4/88; C25B 11/06
[52] U.S. Cl. ................................. 429/42; 204/242; 204/290 R; 204/294; 252/425.3; 427/115; 429/44
[58] Field of Search .................... 252/425.3; 427/115; 429/42, 44; 204/290 R, 294, 242

[56] References Cited

U.S. PATENT DOCUMENTS

| | | | |
|---|---|---|---|
| 3,471,336 | 10/1969 | Sturm et al. | 204/2.1 |
| 3,480,538 | 11/1969 | Sturm | 429/40 |
| 3,791,872 | 2/1974 | Sturm et al. | 252/425.3 |
| 3,793,084 | 2/1974 | Marchetto | 429/40 |
| 3,912,538 | 10/1975 | Dews et al. | 429/44 |
| 4,145,482 | 3/1979 | Von Benda | 429/27 |
| 4,167,607 | 9/1979 | De Nora et al. | 429/40 |
| 4,215,184 | 7/1980 | Gutmann et al. | 429/101 |

FOREIGN PATENT DOCUMENTS

| | | |
|---|---|---|
| 2037795 | 2/1972 | Fed. Rep. of Germany . |
| 2500302 | 7/1975 | Fed. Rep. of Germany . |
| 2823042 | 11/1979 | Fed. Rep. of Germany . |

OTHER PUBLICATIONS

"Brennstoffelemente"—VDI Verlag GmbH Dusseldorf (1971)—p. 49.

Primary Examiner—P. E. Konopka
Attorney, Agent, or Firm—Browdy and Neimark

[57] ABSTRACT

A hydrogen electrode for batteries or galvanic cells in which a first section of the electrode has relatively large pores and serves for the transport of hydrogen and a second section with relatively small pores containing Raney-nickel catalyst. According to the invention, the electrode consists of a metallized fibrous substrate, for example a felt of carbon or textile fibers, with relatively large intrinsic porosity. The Raney-nickel is introduced into this felt from the outside by one of a variety of methods, for example immersion in a vibrating powder bed, by suction of a liquid suspension of Raney-nickel powder or by the application of a paste containing Raney-nickel or a starting alloy therefor. Preferably, the fibrous substrate consists of a number of layers having a preferred fiber orientation, in which at least one of the layers is so turned that the orientation of the fibers is different from that of the surrounding layers, thereby impeding the penetration of Raney-nickel during the manufacture and constituting a zone free from Raney-nickel and of high porosity to serve as a transport layer for hydrogen. A number of examples is presented.

28 Claims, 2 Drawing Figures

BI-POROUS RANEY-NICKEL ELECTRODE

FIELD OF THE INVENTION

The invention relates to electrochemical cells and batteries. More particularly the invention relates to galvanic cells which consume or produce hydrogen.

Still more particularly, the invention relates to galvanic cells in which bi-porous Raney-nickel electrodes are used that include at least one layer with relatively large pores for hydrogen transport as well as one or more layers which have a more finely graded porosity for supporting the electrochemical reaction.

BACKGROUND OF THE INVENTION AND PRIOR ART

In known bi-porous electrodes for galvanic cells, the layer of fine porosity is commonly referred to as the working layer and contains the electrocatalyst Raney-nickel. The basic electrode may then be enhanced or modified by, for example, the application of a cover layer, by a treatment which renders it hydrophobic, and other modifications.

Figure 1:
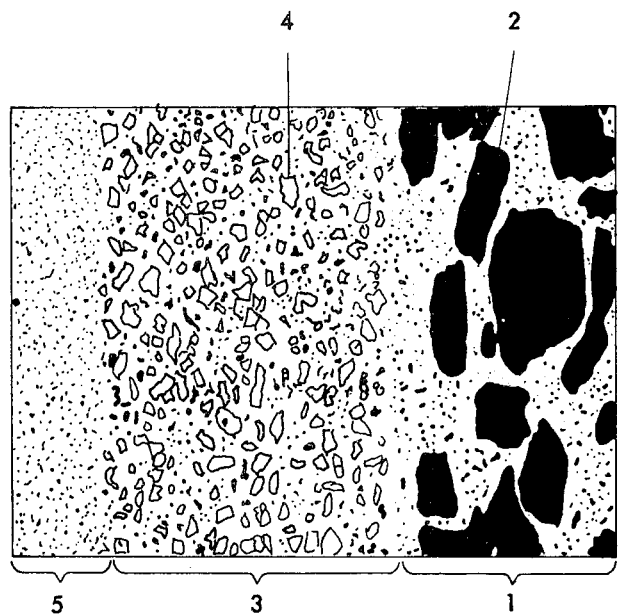
FIG. 1 depicts a prior art hydrogen electrode.

The electrodes are normally produced by the combination of layers having coarse and fine porosity. One method for so joining the layers is by powder metallurgic sintering. Such methods are described, for example, in the publication "Brennstoffelemente" (VDI-Verlag. Düsseldorf 1971). On page 49 of this publication, there is shown the polished section of a three-layer hydrogen electrode. This picture is reproduced as FIG. 1 hereof. In that electrode, the gas transport layer 1 has relatively large pores 2 (shown in black). The working layer 3 contains the Raney-nickel catalyst 4. The electrode is also provided with a cover layer 5 which has no particular consequence to the merits of the present invention.

Also known in the art are symmetric bi-porous electrodes in which a central gas transport layer of coarse porosity is sandwiched between two finely porous working layers containing Raney-nickel.

All electrodes which are produced by hot pressing and sintering are relatively expensive and their maximum dimensions are limited by the inherent limitations of the pressing technology. For example, the aforementioned publication cites the maximum cross-sectional area as $15 \times 20$ cm$^2$.

OBJECT AND SUMMARY OF THE INVENTION

It is thus a principal object of the present invention to provide a bi-porous Raney-nickel electrode which can be produced with cross-sectional surfaces substantially larger than heretofore possible. An associated object of the invention is to produce a Raney-nickel electrode at relatively low cost.

These and other objects are achieved by the present invention by providing that the electrode includes a fibrous substrate of a metallized fibrous material, the metallization consisting in particular of nickel or copper coatings. The invention further provides that the catalyst, i.e., Raney-nickel, or a starting nickel/aluminum alloy, is introduced into the substrate by mechanical forces in such a way that the metallized fiber substrate will include one or more regions free or substantially free of catalyst and constituting the layer of coarse porosity while the region of the substrate which contains catalyst constitutes the working layer having fine porosity and being that layer which faces the counter electrode, i.e. the electrode of opposite polarity.

It is a further principal object of the invention to provide a method for producing electrodes of the aforementioned type, i.e., metallized, in particular nickel- or copper-coated fibers. The method includes filling the substrate by vibration, filtration or by introduction of the material in the form of a paste. Still other steps of the method include unilateral or bilateral filling of the substrate with powdered catalysts or powdered alloy.

Electrodes having several layers and a fibrous substrate have occasionally been described in the literature. For example, the German laid-open application No. 25 00 302 shows a three-layer electrode with a carbon fiber substrate of a thickness of 0.25-0.38 mm having a base layer of hydrophobic graphite and a hydrophobic plastic catalytic layer. The German laid-open application No. 20 37 795 discloses a two-layer electrode with fibrous material in one layer and fibrous material together with catalyst powder in another layer. In this description, the fibrous layer free from catalyst constitutes the cover layer of the electrode and is made of asbestos. However, neither of the aforementioned prior art publications can be said to relate to the present invention because the fibrous substrates disclosed there have very low electrical conductivity, due to not being metallized, and thus cannot contribute in any meaningful way to current or heat conduction, and because the catalyst zone faces the other way; i.e. away from the counter electrode.

Suitable textile substrates for use in the present invention include a number of non-woven fibrous structures, felts, weaves, layers, or knitted and woven fabrics. Needle felts are preferred because they are inexpensive and mechanically stable. The electrodes according to the present invention are preferably constructed from textile substrates of a thickness of 1-6 mm consisting of several layers in which the orientation of the fibers is changed from layer to layer by approximately 90°. The crossing fibers at the interfaces of these layers tend to reduce the available transverse passage and thus prevent the catalyst powder from penetrating beyond the interface. Accordingly, the catalyst powder remains concentrated in the external layer or layers where it constitutes the working layer of the electrode. The part of the textile substrate not containing catalyst then becomes the gas transport layer having large pores. It is also possible to construct the electrode with a central woven layer both sides of which are provided with felt layers, wherein the interface between the two different layers again constitutes the border between the working layer and the gas transport layer.

The metallization of the fibrous substrate may be performed in per se known manner by electroless or by galvanic processes, or by chemical vapor deposition or sputtering. When the substrate is made from carbon felt, it is capable of direct galvanic metallization which is preferable. When non-conducting organic fibers are used, the material may be subjected to a nickel coating by the thermal decomposition of nickel tetracarbonyl. It is also possible to deposit nickel by known electroless methods after activation. Preferably the density of metallic deposit is in a range from 0.3-0.7 grams of metal per cm$^3$ of fibrous substrate.

Figure 2:
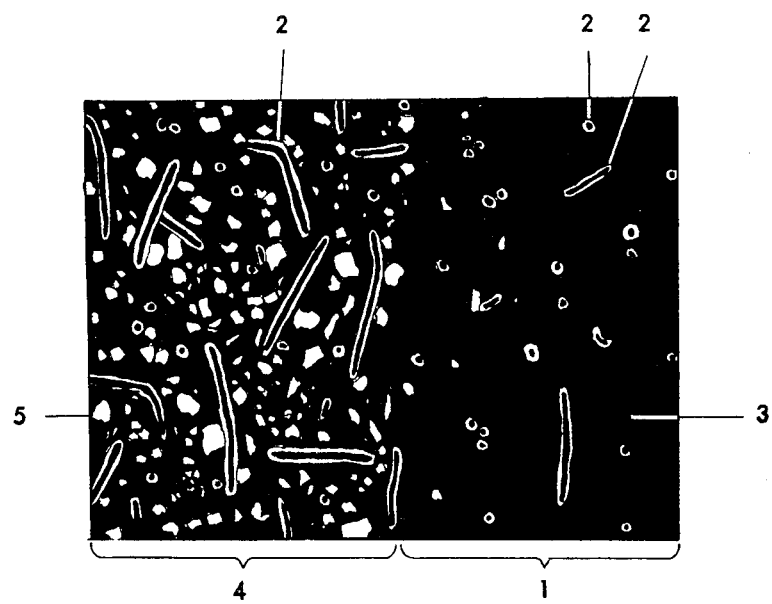
FIG. 2 depicts an electrode according to the present invention.

The porosity of the working layer of the electrode lies preferably in the range between 50 and 75% whereas the porosity of the gas transport layer is preferably between 82 and 97%. In the electrode according to the present invention, the porosity of the gas transport layer is substantially higher than in the known bi-porous electrodes. In addition, however, the volume of the pores varies substantially less than is the case in known sintered electrodes where the pores are formed by removal of pore fillers. This striking difference may best be seen in the polished section shown in FIG. 2 which constitutes an example of an electrode according to the present invention. The gas transport layer 1 having large pores includes fibers 2 and all the space 3 between the fibers serves for transporting gas. The working layer 4 includes the fibers 2 of the substrate as well as the catalyst grains 5.

It will be appreciated that the open fiber structure of the electrode of the invention substantially reduces the flow resistance when compared to the sintered electrodes known in the art. Another advantage of the invention is that the orientation of the fibers in the gas transport layer may be chosen so as to further minimize the flow resistance, for example by orienting the fibers generally parallel to the flow of the fluid. The catalytic powder used to fill the electrodes may be pure Raney-nickel in a conserved, i.e., non-pyrophoric form, or a nickel/aluminum starting alloy which is subsequently converted in a caustic solution to Raney-nickel. In either case, it is possible to add powdered nickel to an overall weight percentage of 50%. The addition of nickel serves to support the normally finely powdered Raney-nickel during the operation of the electrode. The Raney-nickel may also be supported by subsequent nickel coating of the electrode body, for example by immersion in a customary electroless nickel-plating bath where a small amount of nickel is deposited without electric current, the pH value of the bath being adjusted to prevent chemical attack of the Raney-nickel component. However, the nickel plating may also be performed galvanically.

The fibrous substrate may be filled with powdered catalyst, for example by vibratory filling. In such a case, the substrate is placed in a catalyst powder bed and the vibration is effected by either agitating the substrate or the powder or both. The powder bed may also be employed in the form of a fluidized bath. The fibrous substrate may be completely immersed in the powder or it may be covered unilaterally with the catalyst powder depending on whether one or both sides of the substrate are to be filled with powder. If two substrates are joined along a mutual surface by suitable means and subsequently immersed or treated in the powder bed, it is possible to so produce two unilaterally filled electrodes in one step. The degree of filling with powder or the depth of penetration of the powder in the substrate depends on the time of treatment as well as on the size and the distribution of the grains in the powder. It further depends on the size and distribution of the pores in the substrate. The required grain size, which may be obtained by a suitable degree of milling, may be found easily by a few routine tests which give information regarding the desired degree of filling and depth of penetration.

For vibratory filling, it is suitable to mix the powder with a suitable fluid such as water and/or alcohol, the percentage of solid material in the mixture being suitably between 50 and 70 weight percent. The depth of penetration in this method is greater than when dry powder is used for all other parameters being the same, for example the grain size and pore diameter.

The fibrous substrate may also be filled with Raney-nickel by filtration. This method makes use of the stopping effect offered by the boundary layers in multi-layer needle felts. At the boundary layer, the particles in the powder tend to form bridges which prevent the further penetration of new powder and thus enhance the degree of filling of the first layer.

The catalyst powder may also be applied in the form of a paste after admixture of a suitable fluid. When a paste is used it must be carefully distributed uniformly over the entire surface. In this case, a multilayer substrate also enhances the filling.

If it is necessary to fixate the catalyst in the pores of the substrate, it is possible to use a method described in the German patent application No. P 28 23 042.4 where a preliminary fixing is produced by a binder after which the assembly is nickel plated galvanically in a mildly acid nickel bath. However, nickel plating may also take place without electric current. The binder necessary for the fixation may be introduced into the suspension containing the powder for vibrational filling or the powder paste and its concentration is suitably from 0.05–3% of the total weight of the powder. Suitable binders have proven to be, for example, polyvinylalcohol and polyisobutylene, most suitably in the form of solutions of approximately 0.1–5% by weight.

It is also possible to apply to the electrode hydrophobic additives, for example PTFE, most suitably admitted as an emulsion. The hydrophobic additive can also be admitted in powder form together with the Raney-nickel powder, its alloys or pure nickel in a homogeneous mixture.

While the method of the invention has its most direct application to the treatment of fibrous substrates, it is also applicable to similar substrates, for example all open foams, etc.

The conspicuous advantages of the electrode according to the invention are the greatly simplified manufacturing of very large electrode surfaces, the possibility to control the electrode structure by the use of premanufactured fibrous substrate as well as the high thermal and electric conductivity of the fibrous substrate and the extremely high porosity of the layers.

The electrodes according to the present invention may be used in fuel cells, secondary cells and electrolyzer cells and are generally usable for all objectives in which Raney-nickel electrodes are commonly employed.

DESCRIPTION OF PREFERRED EMBODIMENTS

A number of examples of electrodes constructed according to the present invention and the methods for their construction will now be described in detail.

EXAMPLE 1

The electrode substrate consists of five layers of nickel plated carbon felt of the porosity of 88%, the orientation of the fibers in each layer being substantially parallel and the second and fourth layers being rotated by approximately 90° with respect to the other layers. The substrate is approximately 5 mm thick.

The metallized felt is introduced into a powder bed containing a mixture of two parts by weight of Raney-nickel powder (Degussa, Type 213, grain fraction less than 0.02 mm) and one part by weight of powdered nickel (type INCO 255). The powder bed is vibrated for ten minutes at 50 cycles per second with an amplitude of 3 mm. Subsequently, the electrode is immersed in a solution of 0.2 weight % of polyisobutylene in light gasoline and is dried. A metallurgical inspection of the electrode shows that the two outer layers of the electrode are substantially filled with powder mixture whereas the three inner layers are practically free of powder.

EXAMPLE 2

A disc of a diameter of 80 mm consisting of nickel-plated polypropylene felt of a thickness of 3 mm and a porosity of 83% having a central dense woven layer with narrow pores is placed in a Buchner funnel. The edge is sealed with a rubber ring. 5 g of Raney-nickel (Degussa, Type 213, grain fraction less than 0.05 mm) are suspended in 100 ml isopropanol and placed in the funnel. The suspension is constantly stirred. The fluid is aspirated at a differential pressure of 50 cm of water. A metallurigical inspection shows that the concentration of Raney-nickel decreases in the electrode downstream of the frontal layer and that the lower half of the electrode is essentially free of Raney-nickel.

EXAMPLE 3

One part by weight of Raney-nickel starting alloy (Degussa 50/50, Type 013), one part by weight of powdered nickel (Type INCO 123) and one part by weight of an aqueous 4% solution of polyvinyl alcohol are mixed to make a paste. 10 cm$^3$ of this paste are applied to one side of a copper-plated 3 mm thick fibrous fleece of polypropylene which is thereafter dried. The polished micrograph shows that the electrode is filled with the powdered mixture down to a depth of approximately 1 mm.

The foregoing description and examples relate to merely preferred embodiments of the invention, other embodiments and variants thereof are possible without departing from the spirit and scope of the invention.

I claim:

1. A bi-porous electrode, including at least one conducting first layer having relatively large pores and at least one conducting second layer having relatively small pores to face a counter electrode in a cell, and containing Raney-nickel and wherein, said electrode includes a preformed substrate body made of metallized fibrous material in which Raney-nickel particles or a starting alloy therefor are so placed that a space is formed in said substrate which is substantially free from Raney-nickel and constitutes said first layer having relatively large porosity.

2. A bi-porous electrode according to claim 1, wherein said fibrous material consists of organic fibers.

3. A bi-porous electrode according to claim 2, wherein said organic fibers are carbon fibers.

4. A bi-porous electrode according to claim 1, wherein said metallized fibrous material is nickel-plated fibrous material.

5. A bi-porous electrode according to claim 1, wherein said metallized fibrous material is copper-plated fibrous material.

6. A bi-porous electrode according to claim 1, further comprising organic binder means for holding said Raney-nickel particles in place.

7. A bi-porous electrode according to claim 1, wherein said second layer having small pores contains a mixture of 50-90 weight % of said Raney-nickel or said starting alloy therefor and 10-50 weight % of a powdered nickel.

8. A bi-porous electrode according to claim 1, wherein the intrinsic porosity of the metallized fibrous material is between 82 and 97% and the metal coating consists of 0.3-0.7 g of metal per cm$^3$.

9. A method for producing a bi-porous electrode including at least one conducting first layer having relatively large pores and at least one conducting layer having relatively small pores and containing Raney-nickel, said method including the steps of providing a preformed fibrous substrate consisting of metallized fibers, introducing into said substrate Raney-nickel powder; whereby a space is formed in said substrate which is substantially free from Raney-nickel.

10. A method for producing a bi-porous electrode according to claim 9, wherein said fibrous substrate consists of organic fibers.

11. A method for producing a bi-porous electrode according to claim 9, wherein said fibrous substrate consists of carbon fibers.

12. A method for producing a bi-porous electrode according to claim 9, wherein said fibers are nickel-plated.

13. A method for producing a bi-porous electrode according to claim 9, wherein said fibers are copper-plated.

14. A method for producing a bi-porous electrode according to claim 9, further comprising the step of admixing the Raney-nickel powder or the starting alloy therefor with pure nickel powder.

15. A method for producing a bi-porous electrode according to claim 9, comprising the further step of adding an organic binder to fix the Raney-nickel or starting alloy.

16. A method for producing a bi-porous electrode according to claim 9, comprising the further step of rendering the Raney-nickel hydrophobic.

17. A method for producing a bi-porous electrode according to claim 9, wherein the Raney-nickel particles are placed in the fibrous substrate by vibratory filling in powder form.

18. A method for producing a bi-porous electrode according to claim 9 or 14, wherein the introduction of Raney-nickel or mixture of Raney-nickel and nickel powder takes place by filtration from a suspension of particles.

19. A method for producing a bi-porous electrode according to claim 9 or 14, wherein the application of Raney-nickel or mixture of Raney-nickel and nickel powder takes place from the application of a paste containing Raney-nickel powder or mixture thereof with nickel powder.

20. A method for producing a bi-porous electrode according to claim 9, wherein the fibrous substrate is a nickel-plated needle felt.

21. A method for producing a bi-porous electrode according to claim 9, wherein the fibrous substrate is a copper-plated needle felt.

22. A method for producing a bi-porous electrode according to claim 9, wheren said fibrous material is a needle felt having two or more layers, the orientation in adjacent layers varying by 90°.

23. A method for producing a bi-porous electrode according to claim 9, wherein said fibrous material is a needle felt including a central woven layer having substantially smaller pores than the external layers.

24. A method for producing a bi-porous electrode according to claim 9, comprising the further step of fixing the Raney-nickel powder and additive powders by the addition of an organic binder.

25. A method for producing a bi-porous electrode according to claim 24, comprising the further step of nickel-plating.

26. A method for producing a bi-porous electrode according to claim 9, comprising the further step of adding hydrophobic substances to the Raney-nickel powder or the starting alloy therefor.

27. A method for producing a bi-porous electrode according to claim 9, comprising the further step of applying hydrophobic additives to the electrode.

28. In an electro-chemical cell having a counter-electrode and a bi-porous hydrogen electrode comprising at least one conducting first layer having relatively large pores and at least one conducting second layer having relatively small pores and facing said counter-electrode, said second layer containing Raney-nickel, the improvememnt wherein said bi-porous hydrogen electrode comprises a preformed substrate body formed of metallized organic or carbon fibers or open pore foam impregnated with Raney-nickel particles over a portion of the thickness of said preformed substrate body, said Raney-nickel impregnated portion of said preformed substrate body constituting said cell layer having relatively small pores, and the unimpregnated portion of said preformed substrate body constituting the layer having relatively large pores, the metal coating of said preformed substrate consisting of 0.3–0.7 g of metal per $cm^3$, the porosity of said layer having relatively large pores being between 82 and 97% and the porosity of said layer having relatively small pores being between 50 and 75%.

* * * * *